United States Patent Office 3,849,425
Patented Nov. 19, 1974

3,849,425
RESINS CONTAINING PYRIDINE N-OXIDE SALTS OF CARBAMOYL HALIDES
Victor A. Pattison, Tonawanda, N.Y., assignor to Hooker Chemical Corporation, Niagara Falls, N.Y.
No Drawing. Filed Jan. 12, 1973, Ser. No. 323,175
Int. Cl. C07d 31/44
U.S. Cl. 260—295 CA
9 Claims

ABSTRACT OF THE DISCLOSURE

Compositions of the formula:

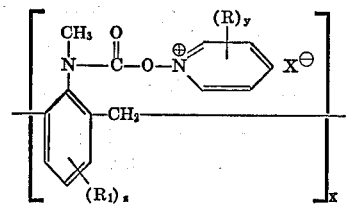

Such resins find utility in fabric treatment, as surfactants, in paper treatment and the like.

---

This invention relates to novel water-soluble resinous compositions. More particularly, this invention relates to novel resinous compositions and the production thereof from components consisting essentially of (a) formaldehyde, (b) N-methyl anilines, (c) carbonic dihalide, and (d) pyridine N-oxides.

The resinous compositions produced in accordance with the present invention are water soluble and find utility in the treatment, in alkaline or acid conditions, of paper, paper products, textiles, as surfactants and the like.

The novel resinous compositions of the present invention are those of the formula

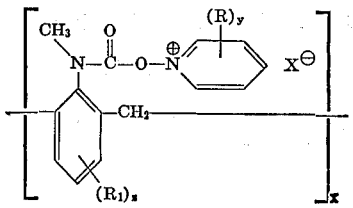

wherein R and $R_1$ are alkyl or aryl radicals, generally having from 1 to 12 carbon atoms; $x$ is a number having a value of from about 1 to about 10, generally from 1 to about 8, and preferably from about 2 to 5; $y$ is a number having a value of from 0 to 1; $z$ is a number having a value of from 0 to 1; and X is halogen.

Exemplary of suitable R and $R_1$ substituents are aromatic radicals such as naphthyl, phenyl and the like; alkyl radicals such as methyl, ethyl, propyl, isopropyl, n-butyl, isobutyl, sec-butyl, hexyl, heptyl, decyl, dodecyl and the like.

The molecular weight of the resinous materials may vary from about 250 to 2500, or higher.

Suitable carbonic dihalides are phosgene, carbonic dibromide, and the like. Preferably phosgene is utilized in producing the novel resins of the present invention.

Suitable N-methyl anilines for formulating the resinous compositions of the present invention include N-methyl aniline; 3,5-dimethyl N-methyl aniline; 4-phenyl N-methyl aniline; 4-naphthyl N-methyl aniline; 4-dodecyl N-methyl aniline; 3-(2-chloro) propyl N-methyl aniline; 3,4,5-trimethyl N-methyl aniline, and the like, as well as mixtures thereof. The most preferred N-methyl aniline is the unsubstituted N-methyl aniline.

Suitable pyridine N-oxides for formulating the resinous compositions of the present invention include 3,5-dimethyl pyridine N-oxide; 3,5-dipropyl pyridine N-oxide; 3-methyl pyridine N-oxide; 4-naphthyl pyridine N-oxide; 4-phenyl pyridine N-oxide; 3-hexyl pyridine N-oxide; 4-(3-chloropropyl) pyridine N-oxide and the like, or mixture thereof. The most preferred reactant is unsubstituted pyridine N-oxide.

The formaldehyde employed may be obtained from such sources as aqueous solutions of formaldehyde, trioxane, paraformaldehyde, and the like. Preferably, the formaldehyde is used as an aqueous solution, about 37 percent by weight formaldehyde.

The preparation of the novel resinous compositions of the present invention is carried out in a process comprising three principal steps or stages:

(a) N-methyl aniline, or a substituted N-methyl aniline is reacted with formaldehyde in a condensation reaction;

(b) The product of (a) is reacted with a carbonic dihalide to produce carbamoyl halide groups;

(c) The product of (b) is reacted with pyridine N-oxide or a substituted pyridine N-oxide.

The reaction of the N-methyl aniline compound and formaldehyde is preferably conducted by adding the formaldehyde on a continuous basis to the N-methyl aniline in a system acidified to a definite acid condition by a suitable mineral acid such as hydrochloric acid, the formaldehyde added in essentially stoichiometric amounts of the N-methyl aniline present. Following the addition of the formaldehyde the reaction mixture is made alkaline by the addition thereto of a suitable alkaline agent, such as aqueous sodium hydroxide, a solid reaction product resulting.

The liquid phase is removed by decantation, and the reaction mixture heated to drive off residual water. The pH of the reaction medium during the reaction is preferably maintained on the order of 1 or less.

The temperature during the condensation reaction is generally maintained at from about 100 to about 160° C., preferably from about 130 to about 160° C. Generally, the time required to effect condensation reaction is on the order from about 60 to about 90 minutes.

The reaction product obtained is then reacted with the selected carbonic dihalide, preferably phosgene, by adding a suitable solvent to the step (a) reaction product, heating to temperatures sufficient to remove any water present, cooling to less than about 35° C., and adding the carbonic dihalide continuously in about stoichiometric amounts to react with the N-methyl amine groups present. Heat is applied to move the temperature gradually up to about 150° C, hydrochloric acid being evolved. The temperature is generally moved through a range of from about 35 to about 150° C. over a period of from about 90 minutes. The solvent is removed by distillation, generally at about 120° C. under reduced pressures.

Suitable solvents include the halogenated aromatics, such as chlorobenzene, dichlorobenzene and the like, chloroform, and additional halogenated aliphatics.

Generally, the reaction is essentially completed within a period of from about 90 to 120 minutes.

The reaction product obtained from step (b) is then reacted with the selected pyridine N-oxide by adding the pyridine N-oxide reactant in about stoichiometric amounts, based on the carbamoyl halide groups present, stirring, and allowing the reaction mixture to stand for 2-8 hours, maintaining the temperature generally at ambient temperatures. The reaction may also be conducted at elevated temperatures.

EXAMPLE 1

Approximately 4 moles N-methyl aniline is condensed with a stoichiometric amount of formaldehyde added as a 37 percent aqueous solution, at a pH of about 1 and a temperature of about 130° C. The reaction product is added to dichlorobenzene solvent and heated to remove the water. Phosgene is added to the reaction system after cooling, and the temperature is gradually increased to about 150° C. over a period of about 90 minutes. Following removal of the solvent, 0.18 moles of the product and 0.18 moles of pyridine N-oxide are dissolved in 100 ml. chloroform. The reaction mixture is stirred overnight, the solvent removed by evaporation, and 56 grams of a gray, water-soluble product recovered having a molecular weight of about 1000.

What is claimed is:

1. A composition of matter

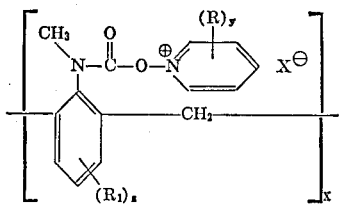

wherein R and $R_1$ are alkyl radicals having from 1 to 6 carbon atoms or aryl radicals having 6 to 10 carbon atoms; X is halogen; $x$ is a number having a value of from 1 to about 10 and $y$ and $z$ are numbers having a value of from 0 to 1.

2. A composition as defined by Claim 1 wherein $x$ is about 3.5.

3. A composition as defined by Claim 1 wherein X is chlorine.

4. A composition as defined by Claim 1 wherein $y$ and $z$ are each 0.

5. A composition as defined by Claim 2 wherein X is chlorine.

6. A composition as defined by Claim 5 wherein $y$ and $z$ are each 0.

7. A process for preparing a composition of the formula

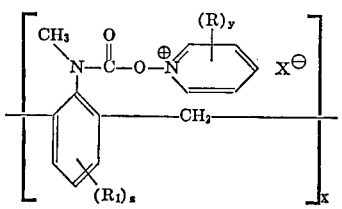

wherein R and $R_1$ are alkyl radicals having from 1 to 6 carbon atoms or an aryl radical having 6 to 10 carbon atoms; X is halogen; $x$ is a number having a value of from 1 to about 10 and $y$ and $z$ are numbers having a value of from 0 to 1, which comprises (a) reacting, in essentially stoichiometric amounts, formaldehyde with an N-methyl aniline of the formula

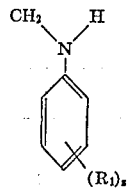

wherein $R_1$ and $z$ are as previously defined, for a time and temperature sufficient to essentially effect complete reaction, (b) reacting therewith phosgene, in the absence of water, (c) reacting the reaction product of (b) with a pyridine N-oxide of the formula

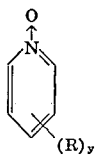

wherein R and $y$ are as previously defined.

8. The process as defined by Claim 7 wherein the aniline reactant is N-methyl aniline.

9. The process as defined by Claim 8 wherein the pyridine N-oxide is pyridine N-oxide.

References Cited
UNITED STATES PATENTS 2,518,266   8/1950   Baird et al. _____ 260—295 AM ALAN L. ROTMAN, Primary Examiner U.S. Cl. X.R.

8—116.2; 106—270; 117—154, 155R; 260—77.5 R, 77.5 Q, 295 Q, 295 F

UNITED STATES PATENT OFFICE
CERTIFICATE OF CORRECTION

Patent No. 3,849,425      Dated November 19, 1974

Inventor(s) Victor A. Pattison

It is certified that error appears in the above-identified patent and that said Letters Patent are hereby corrected as shown below:

Column 3, line 12, following "composition" cancel "of matter" and substitute---of the formula---.

Column 3, line 22, following "having" cancel "from".

Column 4, line 1, following "having" cancel "from".

Signed and sealed this 4th day of March 1975.

(SEAL)
Attest:

RUTH C. MASON
Attesting Officer

C. MARSHALL DANN
Commissioner of Patents
and Trademarks